(12) United States Patent
Shen et al.

(10) Patent No.: US 12,260,629 B2
(45) Date of Patent: Mar. 25, 2025

(54) MULTI-MODAL MODEL TRAINING METHOD AND APPARATUS, IMAGE RECOGNITION METHOD AND APPARATUS, AND ELECTRONIC DEVICE

(71) Applicant: SUZHOU METABRAIN INTELLIGENT TECHNOLOGY CO., LTD., Jiangsu (CN)

(72) Inventors: Chong Shen, Jiangsu (CN); Feng Li, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/697,418

(22) PCT Filed: Sep. 28, 2022

(86) PCT No.: PCT/CN2022/122303
§ 371 (c)(1),
(2) Date: Mar. 29, 2024

(87) PCT Pub. No.: WO2023/159945
PCT Pub. Date: Aug. 31, 2023

(65) Prior Publication Data
US 2024/0331370 A1    Oct. 3, 2024

(30) Foreign Application Priority Data
Feb. 25, 2022 (CN) .......................... 202210174577.9

(51) Int. Cl.
*G06V 10/77*    (2022.01)
*G06F 40/279*   (2020.01)
(Continued)

(52) U.S. Cl.
CPC .......... *G06V 10/806* (2022.01); *G06F 40/279* (2020.01); *G06V 10/40* (2022.01);
(Continued)

(58) Field of Classification Search
CPC .. G06V 10/806; G06V 10/40; G06V 10/7715; G06V 10/774; G06V 10/86; G06F 40/279
See application file for complete search history.

(56) References Cited

U.S. PATENT DOCUMENTS

2018/0189572 A1* 7/2018 Hori .................. G06N 3/044
2020/0175360 A1* 6/2020 Conti ................. G06N 3/04
(Continued)

FOREIGN PATENT DOCUMENTS

| CN | 112464993 A | 3/2021 |
| CN | 113920293 A | 1/2022 |

(Continued)

OTHER PUBLICATIONS

Jandial et al, SAC: Semantic Attention Composition for Text-Conditioned Image Retrieval, 2022 IEEE/CVF Winter Conference on Applications of Computer Vision, pp. 1-10. (Year: 2022).*
(Continued)

*Primary Examiner* — Kathleen M Broughton
(74) *Attorney, Agent, or Firm* — Merchant & Gould P.C.

(57) ABSTRACT

The present application relates to the field of image recognition. Disclosed are a multi-modal model training method and apparatus, an image recognition method and apparatus, and an electronic device. The method comprises: acquiring a sample image and a text feature vector corresponding to the sample image; inputting the sample image into a feature extraction network of an initial multi-modal model, so as to generate an image feature vector corresponding to the sample image; inputting the text feature vector and the image feature vector into a transformer structure of the
(Continued)

initial multi-modal model, and outputting candidate texts corresponding to the sample image; and updating parameters of the initial multi-modal model according to a target text corresponding to the text feature vector, and the candidate texts, so as to determine a target multi-modal model.

18 Claims, 7 Drawing Sheets

(51) Int. Cl.
  *G06V 10/40* (2022.01)
  *G06V 10/774* (2022.01)
  *G06V 10/80* (2022.01)
  *G06V 10/86* (2022.01)
(52) U.S. Cl.
  CPC ........ *G06V 10/7715* (2022.01); *G06V 10/774* (2022.01); *G06V 10/86* (2022.01)

(56) References Cited

U.S. PATENT DOCUMENTS

| | | | | |
|---|---|---|---|---|
| 2021/0027207 A1* | 1/2021 | Bongio Karrman | ... | G06N 20/20 |
| 2021/0110115 A1* | 4/2021 | Hermann | ................ | G06N 3/045 |
| 2021/0297498 A1* | 9/2021 | Divakaran | ......... | G06Q 30/0631 |
| 2021/0303921 A1* | 9/2021 | Niu | ......................... | G06F 40/30 |
| 2021/0390700 A1* | 12/2021 | Lee | ......................... | G06F 18/25 |
| 2021/0406601 A1* | 12/2021 | Narlikar | ................. | G06N 20/00 |

FOREIGN PATENT DOCUMENTS

| | | |
|---|---|---|
| CN | 114005012 A | 2/2022 |
| CN | 114239760 A | 3/2022 |
| EP | 3889830 A1 | 10/2021 |
| WO | 2023159945 A1 | 8/2023 |

OTHER PUBLICATIONS

Zhenyu et al, Image Caption Method Combining Multi-angle with Multi-modality, 2019 IEEE 11th International Conference on Advanced Infocomm Technology, pp. 1-7. (Year: 2019).*

International Search Report and Written Opinion for International Patent Application No. PCT/CN2022/122303, mailed Dec. 27, 2022, with English translation of Search Report.

Chen Xing, "Generation of Chinese Image Description by Multimodal Neural Network", ISSN 1003-3254, Computer Systems & Applications 2020, 29 (9): 191-197 [doi: 10.15888/j.cnki.csa.007513], 7 pgs.

Chinese Search Report received for CN Application No. 2022101745779 on Mar. 28, 2022, 2 pgs.

* cited by examiner

```
┌─────────────────────────────────────┐
│ for each of the features to be generated, according to │
│   position relationships between the feature to be     │
│  generated and the corresponding target generated      │
│      features, distances between the feature to be     │──── S41
│  generated and the corresponding target generated      │
│            features are determined                     │
└─────────────────────────────────────┘
                    │
                    ▼
┌─────────────────────────────────────┐
│ according to the distances between the feature to be   │
│  generated and the corresponding target generated      │
│       features, dependency weights of the target       │
│   generated features relative to the feature to be     │──── S42
│             generated are generated                    │
└─────────────────────────────────────┘
```

MULTI-MODAL MODEL TRAINING METHOD AND APPARATUS, IMAGE RECOGNITION METHOD AND APPARATUS, AND ELECTRONIC DEVICE

CROSS-REFERENCE TO RELATED APPLICATION

The present application is a National Stage Application of International Application No. PCT/CN2022/122303, filed Sep. 28, 2022, which claims priority to Chinese Patent Application No. 202210174577.9, filed with to the China National Intellectual Property Administration on 25 Feb. 2022 and entitled "Multi-Modal Model Training Method and Apparatus, Image Recognition Method and Apparatus, and Electronic Device", which is incorporated herein by reference in its entirety. To the extent appropriate, a claim of priority is made to each of the above disclosed applications.

TECHNICAL FIELD

The present application relates to the field of image recognition, and in particular, to a multi-modal model training method and apparatus, an image recognition method and apparatus, and an electronic device.

BACKGROUND

Since the advent of a transformer (a deep learning model using a self-attention mechanism), great success has been achieved on images and texts. However, real artificial intelligence can understand both images and texts, rather than just images or texts. Therefore, in recent years, relevant research on the problem of understanding in multi-modality (texts and images) emerges much.

Figure 1:
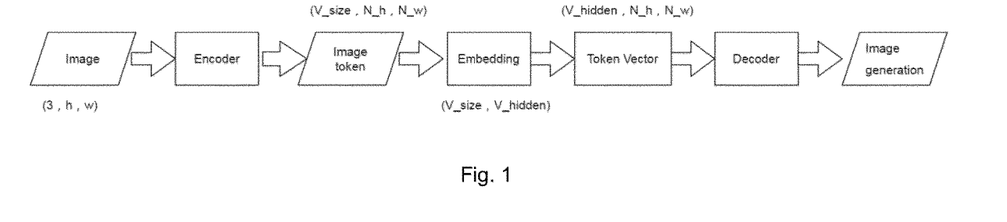
FIG. 1 is a flowchart of encoding and decoding an image feature in the prior art according to an embodiment of the present application.

The existing multi-modal autoregressive models still adopt a method similar to the natural language processed autoregressive models, and focus on how to convert an image into features similar to a text. As shown in FIG. 1, in the mainstream method, operations such as convolution and pooling are performed on an image by using a feature extraction part of a variational autoencoder, so as to finally obtain a vector matrix with the size of V_size*N_h*N_w, wherein V_size is the size of the feature, N_h is the column number of the feature, and N_w is the row number of the feature.

Figure 2:
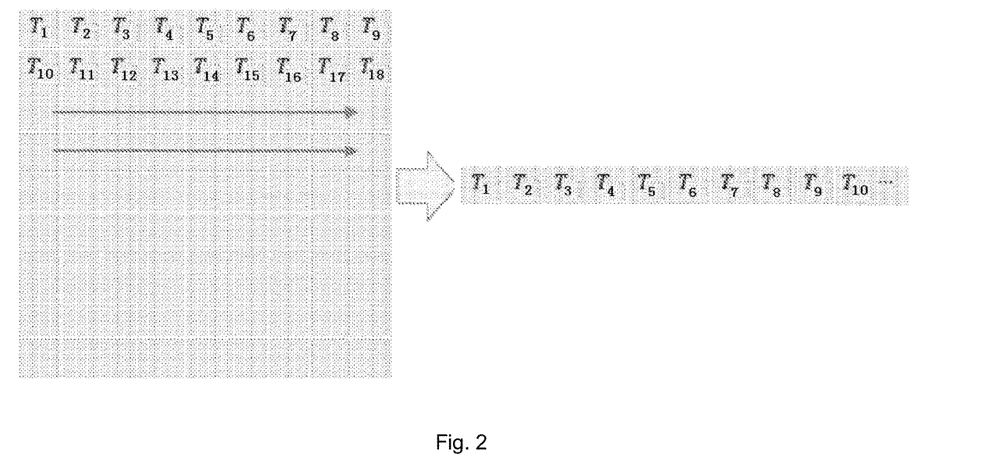
FIG. 2 is a flowchart of an image feature generation sequence in the prior according to an embodiment of the present application.

The main purpose of this part of work is to convert an original image into a representation of features similar to a text, and then to splice various features of the image line by line, as shown in FIG. 2, so as to obtain a representation similar to the text features, the image features can be input into a transformer structure just like text features, and texts corresponding to the original image can be output according to the image features.

Although in the described method, a feature vector of an image is obtained by means of an encoder, the described method splices the feature vectors of the image spliced line by line, and is simply applicable to the autoregressive method of texts (a one-dimensional feature). In the described method, a local receptive field of an image is damaged in a generation process, the amount of information covered by a feature vector is not rich enough, and the relationship with other feature vectors is not considered, as a result, the accuracy of the generated image feature vector is not high, and the image recognition accuracy is not high.

SUMMARY

In view of this, the embodiments of the present application provide a multi-modal model training method and apparatus, an image recognition method and apparatus, and an electronic device, which are intended to solve the problem in the prior art that a local receptive field of an image is damaged in a generation process.

The embodiments of the present application provide a multi-modal model training method, includes:
  sample images and text feature vectors corresponding to the sample images are acquired;
  the sample images are input to the feature extraction network of the initial multi-modal model, so as to generate the image feature vectors corresponding to the sample images, wherein the feature extraction network is used for encoding the sample images, and generating the image feature vectors according to association relationships between features to be generated and generated features;
  the text feature vectors and the image feature vectors are input to a transformer structure of the initial multi-modal model, and candidate texts corresponding to the sample images are output; and
  the parameters of the initial multi-modal model are updated according to target texts corresponding to the text feature vectors, and the candidate texts, so as to determine a target multi-modal model.

According to the multi-modal model training method provided in the embodiments of the present application, sample images and text feature vectors corresponding to the sample images are acquired; the sample images are input into a feature extraction network of an initial multi-modal model, so as to generate an image feature vector corresponding to the sample image, wherein the feature extraction network is used for encoding the sample images, and generating the image feature vectors according to association relationships between features to be generated and generated features, and thus, it may be ensured that the association between the features to be generated and the generated features is considered when image feature vectors are generated, instead of directly splicing features without considering the correlation between various features, so that the described method ensures the accuracy of generated image feature vectors, in addition, the local receptive field of the image is not damaged in the process of generating the image. Then, the text feature vectors and the image feature vectors are input into a transformer structure of the initial multi-modal model, and candidate texts corresponding to the sample images are output, thereby ensuring the accuracy of the generated candidate texts. Parameters of the initial multi-modal model are updated according to target texts corresponding to the text feature vectors, and the candidate texts, so as to determine a target multi-modal model. Thus, the accuracy of the determined target multi-modal model is ensured.

In one embodiment of present application, the sample images are input into the feature extraction network of the initial multi-modal model, so as to generate the image feature vectors corresponding to the sample images includes:
  a feature generation sequence corresponding to each sample image is acquired; and
  the image feature vectors are generated according to the association relationships between the features to be generated and the generated features and the feature generation sequence.

According to the multi-modal model training method according to the embodiments of the present application, a feature generation sequence corresponding to each sample image is acquired, as the feature generation sequence decides the generation order of various features in each image feature vector, the association relationships between the features to be generated and the generated features are decided, and thus, acquiring a feature generation sequence corresponding to a sample image may improve the accuracy of a generated image feature vector. Then, according to the association relationships between the features to be generated and the generated features and the feature generation sequence, image feature vectors are generated, thereby ensuring the accuracy of the generated image feature vectors.

In one embodiment of present application, the image feature vectors are generated according to the association relationships between the features to be generated and the generated features and the feature generation sequence includes:

the target generated features within a preset range of each feature to be generated is acquired;

dependency relationships between each feature to be generated and the target generated features are determined according to position relationship between each feature to be generated and the corresponding target generated features; and according to the dependency relationships between the features to be generated and the target generated features, the image feature vectors are generated according to the feature generation sequence.

According to the multi-modal model training method according to the embodiments of the present application, target generated features within a preset range of each feature to be generated are acquired, thereby ensuring the accuracy of the acquired target generated features. Then, according to position relationships between each feature to be generated and corresponding target generated features, dependency relationships between each feature to be generated and the target generated features are determined, thereby ensuring the accuracy of the determined dependency relationships between each feature to be generated and the target generated features. According to dependency relationships between features to be generated and target generated features, an image feature vector is generated according to a feature generation sequence, thereby ensuring the accuracy of various features in the generated image feature vector, and further ensuring the accuracy of the generated image feature vector.

In one embodiment of present application, dependency relationships between each feature to be generated and the target generated features are determined according to position relationships between each feature to be generated and the corresponding target generated features includes:

for each of the features to be generated, according to position relationships between the feature to be generated and the corresponding target generated features, determining distances between the feature to be generated and the corresponding target generated features; and according to the distances between the feature to be generated and the corresponding target generated features, determining dependency weights of the target generated features relative to the feature to be generated.

In the multi-modal model training method provided in the embodiments of the present application, for each of the features to be generated, according to position relationships between the feature to be generated and the corresponding target generated features, distances between the feature to be generated and the corresponding target generated features are determined, thereby ensuring the accuracy of the determined distances between the feature to be generated and the corresponding target generated features. Then, according to the distances between the feature to be generated and the corresponding target generated features, dependency weights of the target generated features relative to the feature to be generated are determined, so as to ensure the accuracy of the determined dependency weights relative to the feature to be generated, thereby ensuring the accuracy of the determined image feature vector according to the dependency weights of the target generated features relative to the feature to be generated.

In one embodiment of present application, according to the dependency relationships between the features to be generated and the target generated features, the image feature vectors are generated according to the feature generation sequence includes:

each feature to be generated is determined according to the dependency weights of the target generated features relative to each feature to be generated; and according to the features to be generated, the image feature vectors are generated according to the feature generation sequence.

In the multi-modal model training method provided in the embodiments of the present application, each feature to be generated is determined according to the dependency weights of the target generated features relative to the feature to be generated, thereby ensuring the accuracy of each generated feature to be generated. Then, according to the features to be generated and according to a feature generation sequence, image feature vectors are generated, thereby ensuring the accuracy of the generated image feature vectors.

An embodiment of the present application further provides an image recognition method, including:

acquiring a target image to be recognized; and inputting the target image into a target multi-modal model, and outputting a text corresponding to the target image, wherein the target multi-modal model is obtained according to the multi-modal model training method according to any one of the described embodiments.

In the image recognition method provided in the embodiments of the present application, a target image to be recognized is acquired; the target image is input into a target multi-modal model, and a text corresponding to the target image is output; in this way, the text corresponding to the target image is generated according to the target image, and the accuracy of the generated text is ensured.

An embodiment of the present application further provides a multi-modal model training apparatus, including:

a first acquisition module, configured to acquire sample images and text feature vectors corresponding to the sample images;

a generation module, configured to input the sample images into a feature extraction network of an initial multi-modal model, so as to generate image feature vectors corresponding to the sample images, wherein the feature extraction network is used for encoding the sample images, and generating the image feature vectors according to association relationships between features to be generated and generated features;

a first output module, configured to input the text feature vectors and the image feature vectors into a transformer structure of the initial multi-modal model, and outputting candidate texts corresponding to the sample images; and an update module, configured to update parameters of the initial multi-modal model according to target texts corresponding to the text feature vectors, and the candidate texts, so as to determine a target multi-modal model.

In the multi-modal model training apparatus provided in the embodiments of the present application, sample images and text feature vectors corresponding to the sample images are acquired; the sample images are input into a feature extraction network of an initial multi-modal model, so as to generate an image feature vector corresponding to the sample image, wherein the feature extraction network is used for encoding the sample images, and generating the image feature vectors according to association relationships between features to be generated and generated features, and thus, it may be ensured that the association between the features to be generated and the generated features is considered when image feature vectors are generated, instead of directly splicing features without considering the correlation between various features, so that the described method ensures the accuracy of generated image feature vectors, in addition, the local receptive field of the image is not damaged in the process of generating the image. Then, the text feature vectors and the image feature vectors are input into a transformer structure of the initial multi-modal model, and candidate texts corresponding to the sample images are output, thereby ensuring the accuracy of the generated candidate texts. Parameters of the initial multi-modal model are updated according to target texts corresponding to the text feature vectors, and the candidate texts, so as to determine a target multi-modal model. Thus, the accuracy of the determined target multi-modal model is ensured.

An embodiment of the present application further provides an image recognition apparatus, including:
a second acquisition module, configured to acquire a target image to be recognized;
a second output module, configured to input the target image into a target multi-modal model, and output a text corresponding to the target image, wherein the target multi-modal model is obtained according to the multi-modal model training method according to any one of the described embodiments.

In the image recognition apparatus provided in the embodiments of the present application includes, a target image to be recognized is acquired; the target image is input into a target multi-modal model, and a text corresponding to the target image is output; in this way, the text corresponding to the target image is generated according to the target image, and the accuracy of the generated text is ensured.

An embodiment of the present application provides an electronic device, including a memory and a processor, wherein the memory and the processor are in communication connection with each other; the memory stores a computer instruction; and by executing the computer instruction, the processor executes a multi-modal model training method and an image recognition method in any one of the described embodiments.

An embodiment of the present application provides a non-volatile readable storage medium, and the non-volatile readable storage medium stores a computer instruction which causes a computer to execute the multi-modal model training method and the image recognition method in any one of the described embodiments.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description merely relate to some embodiments of the present disclosure, and for a person of ordinary skill in the art, other accompanying drawings can also be obtained according to these accompanying drawings without involving any inventive effort.

DETAILED DESCRIPTION OF THE EMBODIMENTS

To make the objects, technical solutions, and advantages of the embodiments of the present disclosure clearer, hereinafter, the technical solutions in the embodiments of the present application will be described clearly and thoroughly with reference to the accompanying drawings of the embodiments of the present application. Obviously, the embodiments as described are some of the embodiments of the present application, and are not all of the embodiments of the present application. All other embodiments obtained by those of ordinary skill in the art on the basis of the embodiments in the application without creative work shall fall within the scope of protection of the present application.

It should be noted that, in the multi-modal model training method provided in the embodiments of the present application, the executive body thereof may be a multi-modal model training apparatus, the multi-modal model training apparatus may be implemented as part of all of an electronic device by means of software, hardware, or a combination of the software and the hardware. The electronic device may be a server or a terminal. The server in the embodiments of the present application may be a server or a server cluster composed of a plurality of servers. The terminal in the embodiments of the disclosure may be other intelligent hardware devices such as a smart phone, a personal computer, a tablet computer, a wearable device and an intelligent robot. In the following method embodiments, the execution subject being the electronic device is used as an example for description.

Figure 3:
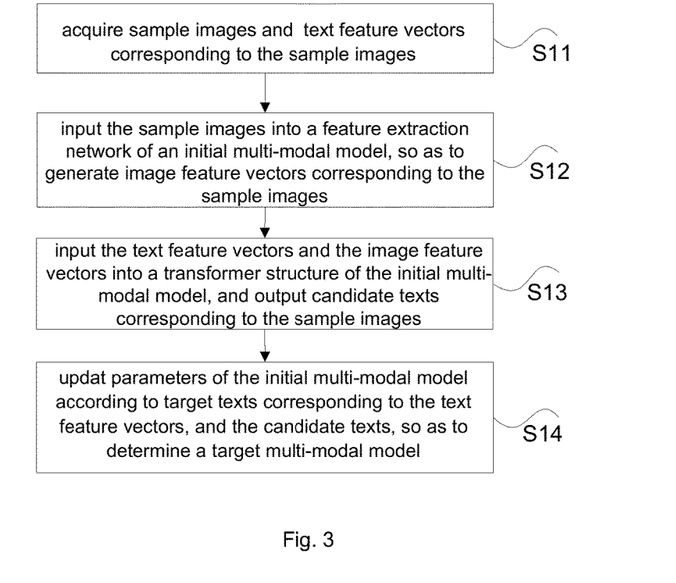
FIG. 3 is a flowchart of a multi-modal model training method according to an embodiment of the present application.

In an embodiment of the present application, as shown in FIG. 3, provided is a multi-modal model training method. For example, the method is applied to the electronic device, and includes the following steps.

At S11, sample images and text feature vectors corresponding to the sample images are acquired.

In an optional implementation of the present application, an electronic device may receive, by means of the connection between the electronic device and another device, sample images sent by another device and text feature vectors corresponding to the sample images; the electronic device may also receive sample images input by the user and text feature vectors corresponding to the sample images.

In another optional implementation of the present application, the electronic device may also receive, by means of the connection between the electronic device and another device, sample images sent by another device and target texts corresponding to the sample images; the electronic device may also receive the sample images input by the user and the target texts corresponding to the sample images.

After receiving the sample images and the target texts corresponding to the sample images, the electronic device performs feature extractions on the target texts corresponding to the sample images, so as to acquire text feature vectors corresponding to the target texts.

The embodiments of the present application do not specifically limit the manner in which the electronic device acquires the sample images and the text feature vectors corresponding to the sample images.

At S12, the sample images are input to the feature extraction network of the initial multi-modal model, so as to generate the image feature vectors corresponding to the sample images.

The feature extraction network is used for encoding the sample images, and generating the image feature vectors according to association relationships between features to be generated and generated features.

Specifically, the electronic device inputs sample images to the feature extraction network of the initial multi-modal model; the feature extraction network encodes the sample images, and generates image feature vectors according to the association relationships between the features to be generated and the generated features.

This step will be described in details below.

At S13, the text feature vectors and the image feature vectors are input to a transformer structure of the initial multi-modal model, and candidate texts corresponding to the sample images are output.

Specifically, the electronic device may input text feature vector and image feature vectors into a transformer structure of an initial multi-modal model, and the transformer structure of the initial multi-modal model converts the text feature vectors and the image feature vectors, thereby candidate texts corresponding to the sample images are output.

Figure 4:
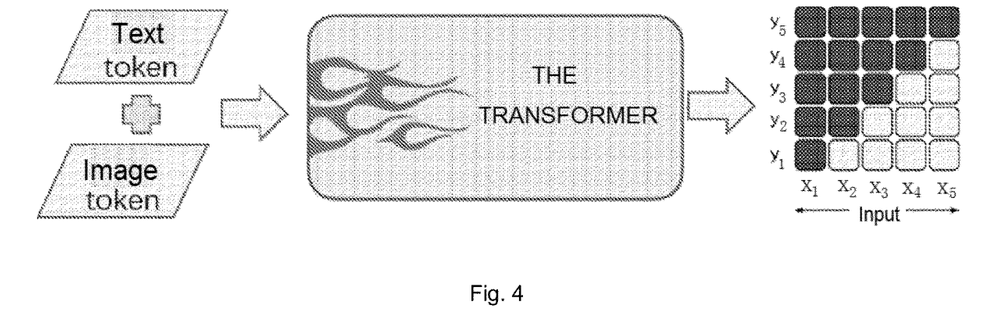
FIG. 4 is a schematic diagram of an autoregressive policy of applying an image and text in a target multi-modal model according to an embodiment of the present application.

Exemplarily, as shown in FIG. 4, a text feature vector and a image feature vector are input to the transformer structure of the initial multi-modal model, and candidate texts corresponding to the sample image are output.

At S14, the parameters of the initial multi-modal model are updated according to target texts corresponding to the text feature vectors, and the candidate texts, so as to determine a target multi-modal model.

Specifically, the electronic device may calculate a loss value according to the target texts and the candidate texts corresponding to the text feature vectors, and then update the parameters of the initial multi-modal model according to the calculated loss value, so as to determine the target multi-modal model.

According to the multi-modal model training method provided in the embodiments of the present application, sample images and text feature vectors corresponding to the sample images are acquired; the sample images are input into a feature extraction network of an initial multi-modal model, so as to generate an image feature vector corresponding to the sample image, wherein the feature extraction network is used for encoding the sample images, and generating the image feature vectors according to association relationships between features to be generated and generated features, and thus, it may be ensured that the association between the features to be generated and the generated features is considered when image feature vectors are generated, instead of directly splicing features without considering the correlation between various features, so that the described method ensures the accuracy of generated image feature vectors, in addition, the local receptive field of the image is not damaged in the process of generating the image. Then, the text feature vectors and the image feature vectors are input into a transformer structure of the initial multi-modal model, and candidate texts corresponding to the sample images are output, thereby ensuring the accuracy of the generated candidate texts. Parameters of the initial multi-modal model are updated according to target texts corresponding to the text feature vectors, and the candidate texts, so as to determine a target multi-modal model. Thus, the accuracy of the determined target multi-modal model is ensured.

Figure 5:
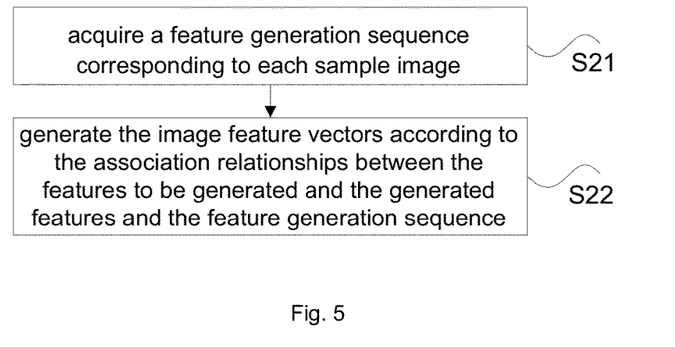
FIG. 5 is a flowchart of a multi-modal model training method according to an embodiment of the present application.

In an optional embodiment of the present application, as shown in FIG. 5, "the sample images are input into the feature extraction network of the initial multi-modal model, so as to generate the image feature vectors corresponding to the sample images" in S12 may include the following steps.

At S21, a feature generation sequence corresponding to each sample image is acquired.

In particular, the electronic device may receive a feature generation sequence corresponding to the sample image input by the user.

Figure 6:
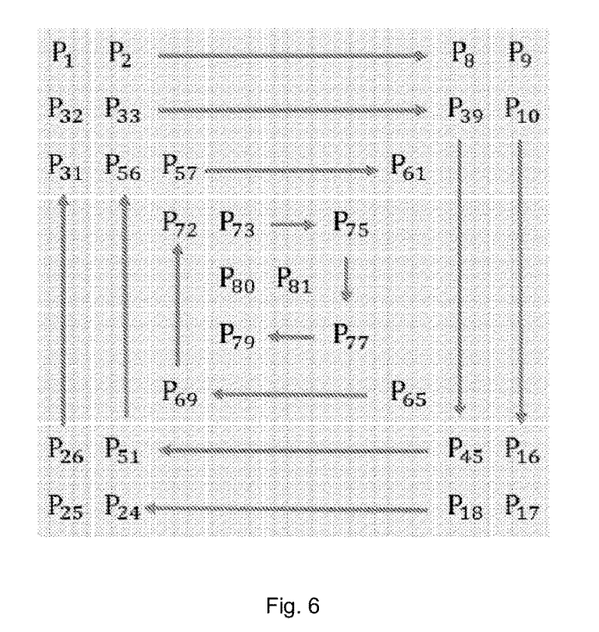
FIG. 6 is a schematic diagram of a feature generation sequence in a multi-modal model training method according to an embodiment of the present application.

In one embodiment of present application, the closer the features in the sample image are to the center position, the more dependent on the surrounding features the features are; furthermore, the closer the features are to the edge position of the sample image, the less dependent of the features are on the surrounding features. Therefore, the feature generation sequence corresponding to the sample image may be a clockwise order from outside to inside. Exemplarily, as shown in FIG. 6, P1 is a first generated feature, and then in a clockwise direction, then P2 is generated, and finally P8 and P9 are generated; and then in a clockwise direction, various features are continuously generated, P10-P17, P18-P25, P26-P32, P33-P39 . . . are generated in sequence.

In one embodiment of present application, the feature generation sequence corresponding to the sample image may be a counterclockwise order from outside to inside, wherein the first feature may start from a feature corresponding to any one of four corners of the sample image.

Based on the described contents, it can be determined that in the embodiments of the present application, when image feature vectors corresponding to sample images are generated, feature generations are not performed line by line, instead, surrounding features are generated first, and then all features are generated from outside to inside according to an association relationships between the features to be generated and generated features nearby.

In S22, the image feature vectors are generated according to the association relationships between the features to be generated and the generated features and the feature generation sequence.

Specifically, after acquiring a feature generation sequence, the electronic device generates the image feature vectors according to the association relationships between the features to be generated and the generated features and the feature generation sequence.

This step will be described in details below.

According to the multi-modal model training method according to the embodiments of the present application, a feature generation sequence corresponding to each sample image is acquired, as the feature generation sequence decides the generation order of various features in each image feature vector, the association relationships between the features to be generated and the generated features are decided, and thus, acquiring a feature generation sequence corresponding to a sample image may improve the accuracy of a generated image feature vector. Then, according to the association relationships between the features to be generated and the generated features and the feature generation sequence, image feature vectors are generated, thereby ensuring the accuracy of the generated image feature vectors.

Figure 7:
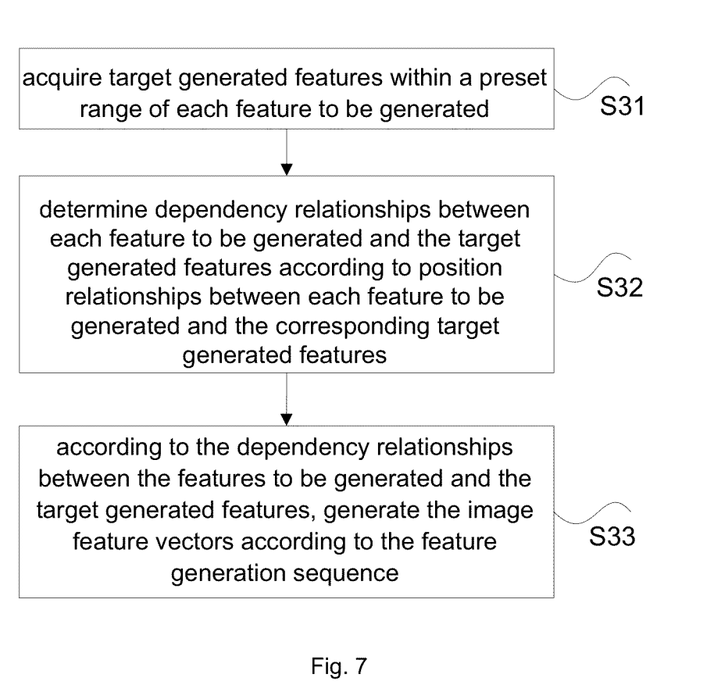
FIG. 7 is a flowchart of a multi-modal model training method according to an embodiment of the present application.

In an optional embodiment of the present application, as shown in FIG. 7, "the image feature vectors are generated according to the association relationships between the features to be generated and the generated features and the feature generation sequence" in S22 may include the following steps:

In S31, the target generated features within a preset range of each feature to be generated is acquired.

In an optional implementation, the electronic device may determine, according to an instruction output by the user, target generated features within a preset range of each feature to be generated.

In an optional implementation, the electronic device may receive target generated features that are input by the user and are within a preset range of each feature to be generated.

In another optional implementation, the electronic device may generate a feature dependency box of N*N according to a user instruction, wherein N is an odd number and greater than 3. Then, the electronic device determines a preset range according to the feature dependency box, so as to obtain target generated features within the preset range of each feature to be generated.

Figure 8:
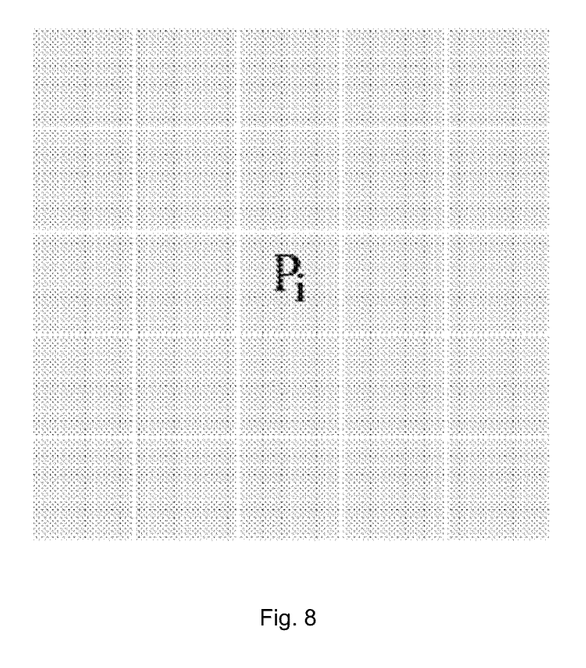
FIG. 8 is a schematic diagram of a feature dependency box in a multi-modal model training method according to an embodiment of the present application.

Exemplarily, when N=5, the feature dependency box is shown in FIG. 8. The feature Pi to be generated is located in the middle of the feature dependency box window, and should be dependent on all the surrounding target generated features as far as possible.

In S32, dependency relationships between each feature to be generated and the target generated features are determined according to position relationship between each feature to be generated and the corresponding target generated features.

Specifically, the electronic device may determine dependency relationships between each feature to be generated and the target generated features according to position relationships between each feature to be generated and the corresponding target generated features.

This step will be described in details below.

In S33, according to the dependency relationships between the features to be generated and the target generated features, the image feature vectors are generated according to the feature generation sequence.

In an optional implementation, after acquiring dependency relationships between the features to be generated and the target generated features, the electronic device may merge the target generated features having a dependency relationship with each feature to be generated, so as to generate each feature to be generated. Then, according to each feature to be generated, the electronic device generates image feature vectors according to the feature generation sequence.

Figure 9:
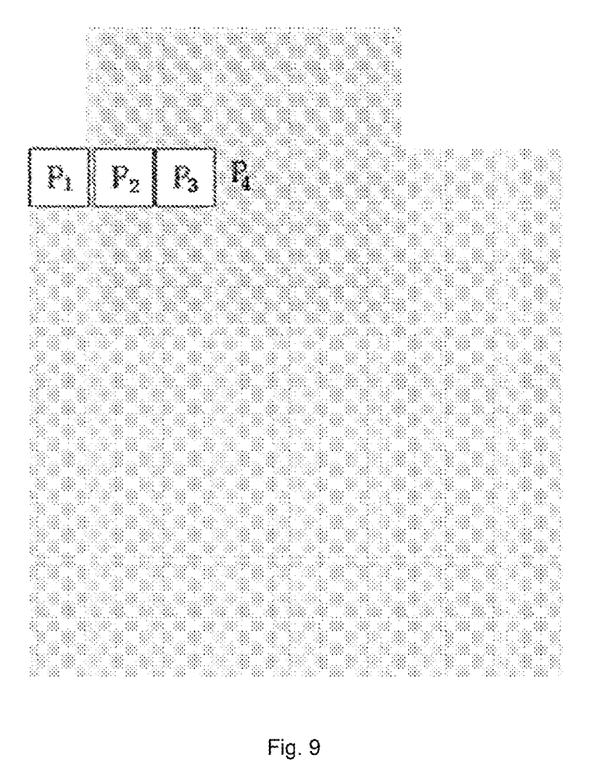
FIG. 9 is a schematic diagram of a dependency relationships between a feature P4 to be generated and target generated features in a multi-modal model training method according to an embodiment of the present application.

Exemplarily, as shown in FIG. 9, during the generation of the feature P4 to be generated, according to the 5*5 feature dependency box mentioned in the foregoing embodiment and the feature generation sequence shown in FIG. 6, it is determined that the feature P4 to be generated can only depend on the target generated features P2 and P3; therefore, the electronic device can merge the target generated features P2 and P3 according to the dependency relationships between the feature P4 to be generated and the target generated features P2 and P3, to generate a feature P4 to be generated. Then, according to the feature P4 to be generated, the electronic device generates an image feature vector according to the feature generation sequence.

Figure 10:
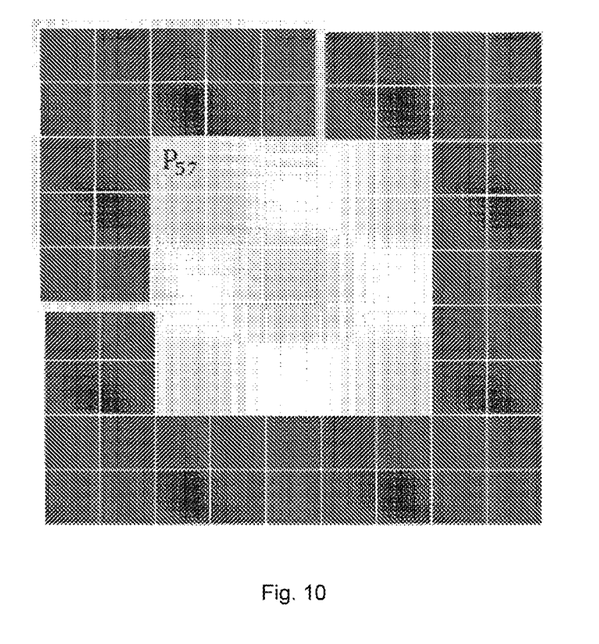
FIG. 10 is a schematic diagram of a dependency relationships between a feature P57 to be generated and target generated features in a multi-modal model training method according to an embodiment of the present application.

Exemplarily, as shown in FIG. 10, during the generation of the feature P57 to be generated, according to the 5*5 feature dependency box mentioned in the foregoing embodiment and the feature generation sequence shown in FIG. 6, generated features, on which the feature P57 to be generated depends, not only includes row features but also includes column features. As shown in FIG. 10, the black area represents all generated features, and according to the 5*5 feature dependency box mentioned in the above embodiment and the feature generation sequence shown in FIG. 5, it is determined that the target generated features on which the feature P57 to be generated depends are P1-P5, P39-P36 and P54-P56. Then, according to the feature 57 to be generated, the electronic device generates an image feature vector according to the feature generation sequence.

According to the multi-modal model training method according to the embodiments of the present application, target generated features within a preset range of each feature to be generated are acquired, thereby ensuring the accuracy of the acquired target generated features. Then, according to position relationships between each feature to be generated and corresponding target generated features, dependency relationships between each feature to be generated and the target generated features are determined, thereby ensuring the accuracy of the determined dependency relationships between each feature to be generated and the target generated features. According to dependency relationships between features to be generated and target generated features, an image feature vector is generated according to a feature generation sequence, thereby ensuring the accuracy of various features in the generated image feature vector, and further ensuring the accuracy of the generated image feature vector.

Figure 11:
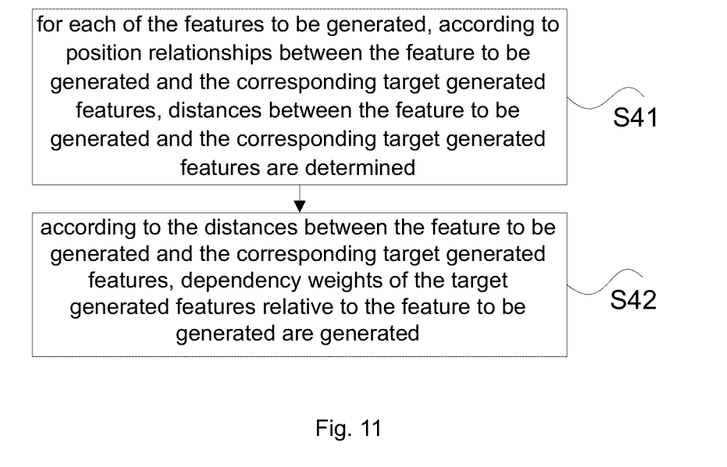
FIG. 11 is a flowchart of a multi-modal model training method according to an embodiment of the present application.

In an optional embodiment of the present application, as shown in FIG. 11, "dependency relationships between each feature to be generated and the target generated features are determined according to position relationships between each feature to be generated and the corresponding target generated features" in S32 may include the following steps:

In S41, for each of the features to be generated, according to position relationships between the feature to be generated and the corresponding target generated features, distances between the feature to be generated and the corresponding target generated features are determined.

Specifically, for each of the features to be generated, the electronic device may acquire the positions of the feature to be generated and corresponding target generated features, and then determine position relationships between the feature to be generated and the corresponding target generated features according to the positions of the feature to be generated and the corresponding target generated features. The electronic device determines, for each of the features to be generated, distances between the feature to be generated and the corresponding target generated features according to position relationships between the feature to be generated and the corresponding target generated features.

Figure 12:
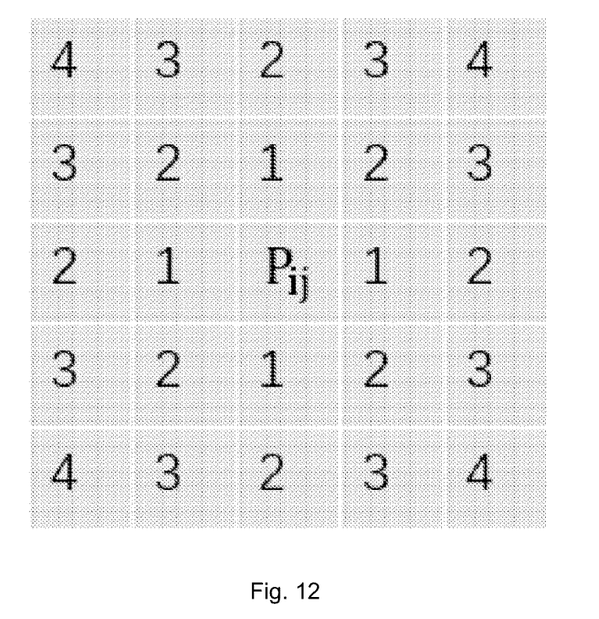
FIG. 12 is a schematic diagram of distances between features to be generated and corresponding target generated features in a multi-modal model training method according to an embodiment of the present application.

Exemplarily, FIG. 12 shows distances between a feature Pij to be generated and corresponding target generated features.

In S42, according to the distances between the feature to be generated and the corresponding target generated features, dependency weights of the target generated features relative to the feature to be generated are generated.

Specifically, a text often has a long context dependency. Different from a text, a sample image has a stronger dependence on a certain spatial range and a weaker dependence on more remote areas, therefore, when calculating the self-attention weight, it is necessary to add a dependent weight for intervention, in order to calculate the dependency weight of the feature to be generated (the feature to be generated at the position of row i and column j) on the target generated features, the formula is designed as follows:

$$W_{xy} = \frac{\frac{1}{S_{xy}}}{\sum \frac{1}{S_{ij}}},$$

wherein Sxy is the distance from a target generated feature at the position of an xth row and a yth column to the feature to be generated Pij; Sij∈ {distances from all target generated features to the feature to be generated}, i∈ [0,Nw], j∈ [0,Nh], Nw is a row number of the feature in the sample image, and Nh is a column number of the feature in the sample image.

In the multi-modal model training method provided in the embodiments of the present application, for each of the features to be generated, according to position relationships between the feature to be generated and the corresponding target generated features, distances between the feature to be generated and the corresponding target generated features are determined, thereby ensuring the accuracy of the determined distances between the feature to be generated and the corresponding target generated features. Then, according to the distances between the feature to be generated and the corresponding target generated features, dependency weights of the target generated features relative to the feature to be generated are determined, so as to ensure the accuracy of the determined dependency weights relative to the feature to be generated, thereby ensuring the accuracy of the determined image feature vector according to the dependency weights of the target generated features relative to the feature to be generated.

Figure 13:
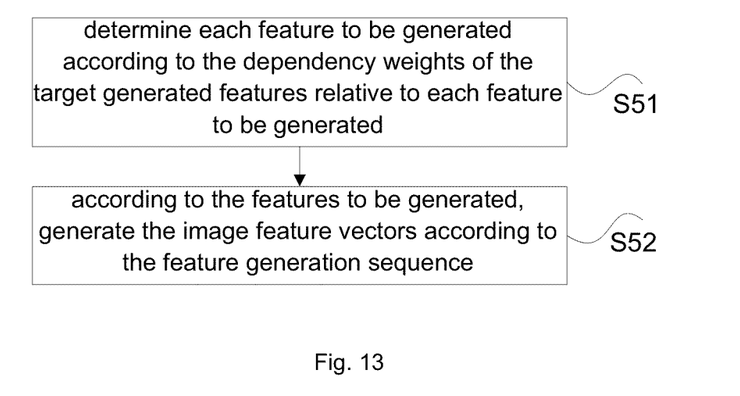
FIG. 13 is a flowchart of a multi-modal model training method according to an embodiment of the present application.

In an optional embodiment of the present application, as shown in FIG. 13, "according to the dependency relationships between the features to be generated and the target generated features, the image feature vectors are generated according to the feature generation sequence" in S33 may include the following steps:

In S51, each feature to be generated is determined according to the dependency weights of the target generated features relative to each feature to be generated.

Specifically, after acquiring by calculation the dependency weights of the target generated features relative to the feature to be generated, by using the following formula, the electronic device may determine the feature Tij to be generated according to the dependency weights of the target generated features relative to the features to be generated. The calculation may be expressed in the following manner:

$$Tij = \sum W, vA(x, y) \qquad (2)$$

wherein Wxy represents a dependency weight of the target generated feature relative to the feature to be generated; A(x, y) is a target generated feature corresponding to the feature to be generated in the xth row and yth column, wherein i∈ [0,Nw], j∈ [0,Nh], Nw is a row number of the features in the sample image, and Nh is a column number of the features in the sample image.

In step S52, according to the features to be generated, the image feature vectors are generated according to the feature generation sequence.

Specifically, after generating the features to be generated, according to the features to be generated, the electronic device generates image feature vectors according to a feature generation sequence.

In the multi-modal model training method provided in the embodiments of the present application, each feature to be generated is determined according to the dependency weights of the target generated features relative to the feature to be generated, thereby ensuring the accuracy of each generated feature to be generated. Then, according to the features to be generated and according to a feature generation sequence, image feature vectors are generated, thereby ensuring the accuracy of the generated image feature vectors.

In order to better introduce the target multi-modal model obtained by training using the foregoing multi-modal model training method, an embodiment of the present application provides an image recognition method. It should be noted that, in the image recognition method provided in the embodiments of the present application, the executive body thereof may be an image recognition apparatus, the image recognition apparatus may be implemented as part of all of an electronic device by means of software, hardware, or a combination of the software and the hardware. The electronic device may be a server or a terminal. The server in the embodiments of the present application may be a server or a server cluster composed of a plurality of servers. The terminal in the embodiments of the disclosure may be other intelligent hardware devices such as a smart phone, a personal computer, a tablet computer, a wearable device and an intelligent robot. In the following method embodiments, the execution subject being the electronic device is used as an example for description.

Figure 14:
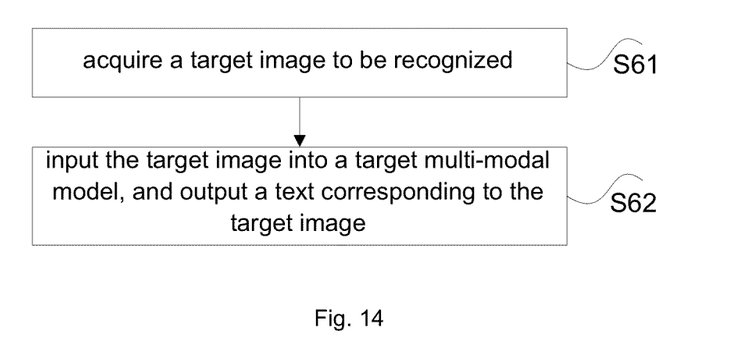
FIG. 14 is a flowchart of an image recognition method according to an embodiment of the present application.

In an embodiment of the present application, as shown in FIG. 14, provided is an image recognition apparatus method. For example, the method is applied to the electronic device, and includes the following steps.

In S61, a target image to be recognized is acquired.

Specifically, the electronic device may receive a target image sent by another device, and may also receive a target image input by a user.

In step S62, the target image is input to the target multi-modal model, and a text corresponding to the target image is output.

The target multi-modal model is obtained according to the multi-modal model training method of any one of the described embodiments.

Specifically, the electronic device may perform training to obtain the target multi-modal model on the basis of the sample images and the target texts corresponding to the sample images. Then, the electronic device inputs the target image to the target multi-modal model, and a feature extraction network in the target multi-modal model encodes the target image, and generates image feature vectors according to the association relationships between the features to be generated and the generated features.

Then, the feature vectors of the target image are input to a transformer structure in the target multi-modal model, and the text corresponding to the target image is output.

In the image recognition method provided in the embodiments of the present application, a target image to be recognized is acquired; the target image is input into a target multi-modal model, and a text corresponding to the target image is output; in this way, the text corresponding to the target image is generated according to the target image, and the accuracy of the generated text is ensured.

It should be understood that although the steps in the flowcharts of FIGS. 3, 5, 7, 11, and 13-14 are displayed in sequence as indicated by the arrows, these steps are not necessarily executed in sequence as indicated by the arrows. Unless explicitly specified herein, these steps are not performed in strict sequence, and these steps may be performed in other sequences. Furthermore, at least a part of the steps in FIGS. 3, 5, 7, 11, and 13-14 may include a plurality of steps or a plurality of stages. These steps or stages are not necessarily executed at the same time, but may be executed at different times. The execution sequence of these steps or stages is not necessarily executed in sequence, and may be executed in turn or alternately with at least a part of the other steps, or steps or stages of other steps.

Figure 15:
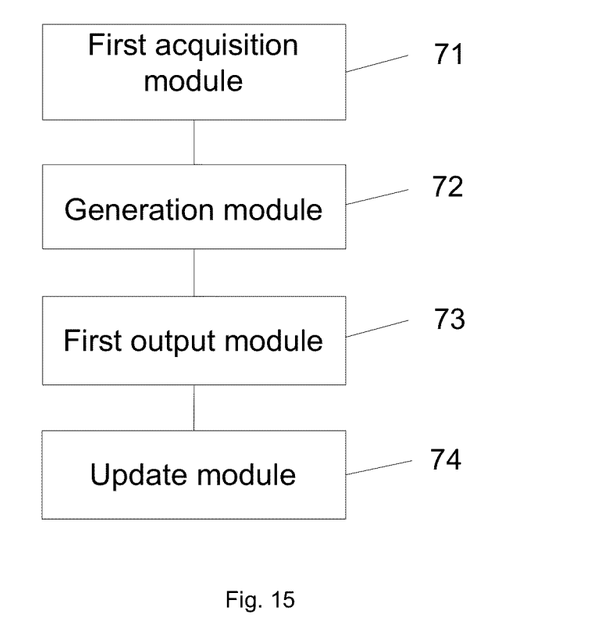
FIG. 15 is a functional block diagram of a multi-modal model training apparatus according to an embodiment of the present application.

As shown in FIG. 15, the present embodiment provides a multi-modal model training apparatus, including:

a first acquisition module 71, configured to acquire sample images and text feature vectors corresponding to the sample images;

a generation module 72, configured to input the sample images into a feature extraction network of an initial multi-modal model, so as to generate image feature vectors corresponding to the sample images, wherein the feature extraction network is used for encoding the sample images, and generate the image feature vectors according to association relationships between features to be generated and generated features;

a first output module 73, configured to input the text feature vectors and the image feature vectors into a transformer structure of the initial multi-modal model, and output candidate texts corresponding to the sample images; and an update module 74, configured to update parameters of the initial multi-modal model according to target texts corresponding to the text feature vectors, and the candidate texts, so as to determine a target multi-modal model.

In an embodiment of the present application, the generation module 72 is specifically configured to acquire a feature generation sequence corresponding to each sample image; and generate the image feature vectors according to the association relationships between the features to be generated and the generated features and the feature generation sequence.

In an embodiment of the present application, the generation module 72 is specifically configured to acquire target generated features within a preset range of each feature to be generated; determine dependency relationships between each feature to be generated and the target generated features according to position relationships between each feature to be generated and the corresponding target generated features; and according to the dependency relationships between the features to be generated and the target generated features, generate the image feature vectors according to the feature generation sequence.

In an embodiment of the present application, the generation module 72 is specifically configured to determine, for each of the features to be generated and according to position relationships between the feature to be generated and the corresponding target generated features, distances between the feature to be generated and the corresponding target generated features; and determine, according to the distances between the feature to be generated and the corresponding target generated features, dependency weights of the target generated features relative to the feature to be generated.

In an embodiment of the present application, the generation module 72 is specifically configured to determine each feature to be generated according to the dependency weights of the target generated features relative to each feature to be generated; and generate, according to the features to be generated, the image feature vectors according to the feature generation sequence.

Figure 16:
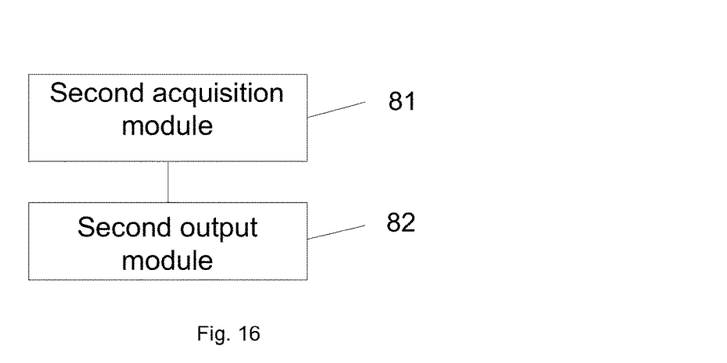
FIG. 16 is a functional block diagram of an image recognition apparatus according to an embodiment of the present application.

As shown in FIG. 16, the present embodiment provides an image identification apparatus, including:

a second acquisition module 81, configured to acquire a target image to be recognized;

a second output module 82, configured to input the target image into a target multi-modal model, and output a text corresponding to the target image, wherein the target multi-modal model is obtained according to the multi-modal model training method according to any one of the described embodiments.

For the specific limitations and beneficial effects of the multi-modal model training apparatus and the image recognition apparatus, reference may be made to the limitations of the multi-modal model training method and the image recognition method in the description above, and it will not be repeated here. The modules in the multi-modal model training apparatus and the image recognition apparatus may be fully or partially implemented by software, hardware or a combination thereof. The modules may be embedded in or independent of the processor in the electronic device in the form of hardware, and may also be stored in the memory of the electronic device in the form of software, so that the processor can perform the corresponding operations of the above modules.

An embodiment of the present application further provides an electronic device, including the multi-modal model training apparatus as shown in FIG. 15 and the image recognition device as shown in FIG. 16.

Figure 17:
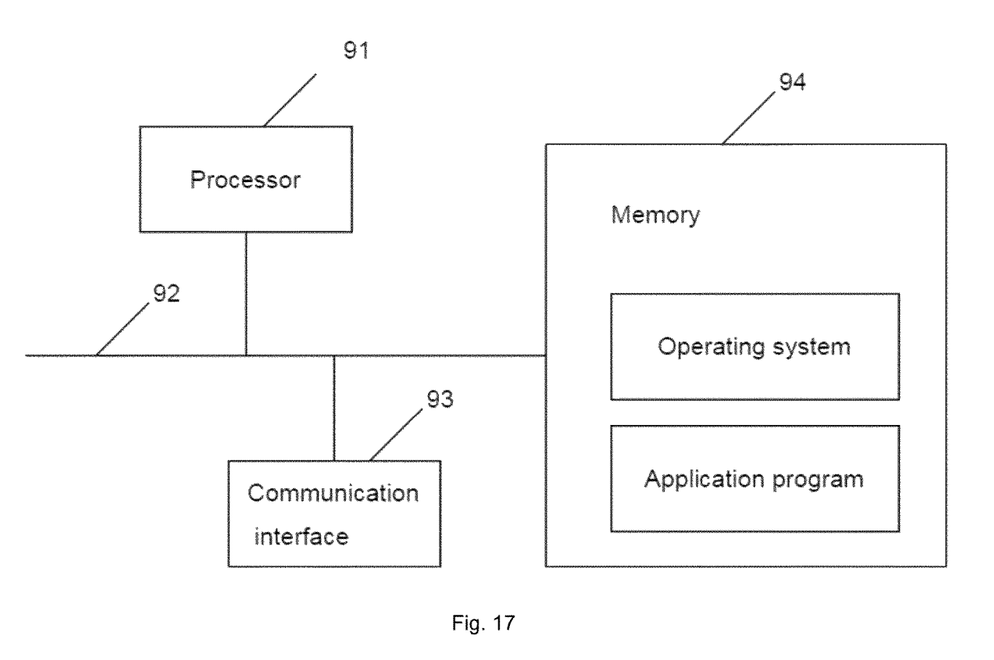
FIG. 17 is a schematic structural diagram of hardware of an electronic device according to an embodiment of the present application.

As shown in FIG. 17, FIG. 17 is a schematic structural diagram of an electronic device according to an optional embodiment of the present application. As shown in FIG. 17, the electronic device may include at least one processor 91, for example, a Central Processing Unit (CPU), at least one communication interface 93, a memory 94, and at least one communication bus 92. The communication bus 92 is configured to implement connection and communication between these components. The communication interface 93 may include a display screen (Display) and a keyboard (Keyboard). The optional communication interface 93 may also include a standard wired interface and a standard wireless interface. The memory 94 may be a high-speed Random Access Memory (RAM), and may also be a non-volatile memory, for example, at least one disk memory. In one embodiment of present application, the memory 94 may also be at least one storage device located away from the processor 91. The processor 91 may be combined with the apparatus described in FIG. 15 or FIG. 16, an application program is stored in the memory 94, and the processor 91 invokes program codes stored in the memory 94 to perform any of the described method steps.

The communications bus 92 may be a Peripheral Component Interconnect (PCI) bus, an extended industry standard architecture (EISA) bus, and the like. The communication bus 92 may be classified into an address bus, a data bus, a control bus, and the like. For convenience of representation, only one bold line is used for representation in FIG. 17, but it does not indicate that there is only one bus or one type of bus.

The memory 94 may include a volatile memory, such as a random-access memory (RAM). The memory may further include a non-volatile memory, such as a flash memory, a hard disk drive (HDD) or a solid-state drive (SSD). The memory 94 may further include a combination of the above memories.

The processor 91 may be a central processing unit (CPU), a network processor (NP) or a combination of CPU and NP.

The processor 91 may further include a hardware chip. The hardware chip may be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

In one embodiment of present application, the memory 94 is further configured to store program instructions. The processor 91 may call the program instructions to implement the multi-modality model training method as shown in the embodiments of FIG. 3, FIG. 5, FIG. 7, FIG. 11 and FIG. 13 of the present application and the image recognition method as shown in the embodiment in FIG. 14.

A non-transitory computer storage medium is further provided according to an embodiment of the present disclosure. The computer storage medium stores computer executable instructions which may execute multi-modal model training method and the image recognition method in any of the method embodiments. The storage medium may be a magnetic disk, an optical disk, a Read-Only Memory (ROM), a Random Access Memory (RAM), a Flash Memory, a Hard Disk Drive (HDD) or a Solid-State Drive (SSD). The storage medium may further include a combination of the above memories.

Although the embodiments of the present application have been described in conjunction with the drawings, those skilled in the art can make various modifications and variations without departing from the spirit and scope of the present disclosure, and such modifications and variations are all within the scope defined by the appended claims.

The invention claimed is:

1. A multi-modal model training method, wherein the method comprises:
   acquiring sample images and text feature vectors corresponding to the sample images;
   inputting the sample images into a feature extraction network of an initial multi-modal model, so as to generate image feature vectors corresponding to the sample images, wherein the feature extraction network is used for encoding the sample images, and generating the image feature vectors according to association relationships between features to be generated and generated features;
   inputting the text feature vectors and the image feature vectors into a transformer structure of the initial multi-modal model, and outputting candidate texts corresponding to the sample images; and
   updating parameters of the initial multi-modal model according to target texts corresponding to the text feature vectors, and the candidate texts, so as to determine a target multi-modal model;
   wherein inputting the sample images into the feature extraction network of the initial multi-modal model, so as to generate the image feature vectors corresponding to the sample images comprises: acquiring a feature generation sequence corresponding to each sample image; and generating the image feature vectors according to the association relationships between the features to be generated and the generated features and the feature generation sequence;
   wherein generating the image feature vectors according to the association relationships between the features to be generated and the generated features and the feature generation sequence comprises: determining the generated features around each feature to be generated; and generating, from outside to inside, all the image feature vectors according to the association relationships between the features to be generated and the generated features around same and the feature generation sequence.

2. The method according to claim 1, wherein acquiring sample images and text feature vectors corresponding to the sample images comprises:
   acquiring the sample images and target texts corresponding to the sample images; and
   extracting features of the target texts corresponding to the sample images, and acquiring the corresponding text feature vectors.

3. The method according to claim 1, wherein generating the image feature vectors according to the association relationships between the features to be generated and the generated features and the feature generation sequence comprises:
acquiring target generated features within a preset range of each feature to be generated;
determining dependency relationships between each feature to be generated and the target generated features according to position relationships between each feature to be generated and the corresponding target generated features; and
according to the dependency relationships between the features to be generated and the target generated features, generating the image feature vectors according to the feature generation sequence.

4. The method according to claim 3, wherein before acquiring the target generated features within the preset range of each feature to be generated, the method further comprises:
acquiring a feature dependency box; and
determining the preset range according to the feature dependency box.

5. The method according to claim 4, wherein the size of the feature dependency box is N*N, and N is an odd number and greater than 3.

6. The method according to claim 3, wherein determining the dependency relationships between each feature to be generated and the target generated features according to the position relationships between each feature to be generated and the corresponding target generated features comprises:
for each of the features to be generated, according to position relationships between the feature to be generated and the corresponding target generated features, determining distances between the feature to be generated and the corresponding target generated features; and
according to the distances between the feature to be generated and the corresponding target generated features, determining dependency weights of the target generated features relative to the feature to be generated.

7. The method according to claim 6, wherein according to the distances between the feature to be generated and the corresponding target generated features, determining dependency weights of the target generated features relative to the feature to be generated comprises:
according to the distances between the feature to be generated and the corresponding target generated features, using a preset dependency weight calculation formula to determine dependency weights of the target generated features relative to the feature to be generated, wherein the preset weight dependency calculation formula is:

$$W_{xy} = \frac{\frac{1}{S_{xy}}}{\sum \frac{1}{S_{ij}}},$$

wherein Sxy is the distance from a target generated feature at the position of an xth row and a yth column to the feature to be generated Pij; Pij is a feature to be generated at the position of an ith row and a jth column; Sij∈ {distances from all target generated features to the feature to be generated}, i∈ [0, Nw], j∈ [0, Nh], x∈ [0, Nw], y∈ [0, Nh], Nw is a row number of the features in the sample image, and Nh is a column number of the features in the sample image; Wxy is the dependency weight of the feature Pij to be generated on the target generated feature at the position of the xth row and the yth column.

8. The method according to claim 6, wherein according to a dependency relationships between the features to be generated and the target generated features, generating the image feature vectors according to the feature generation sequence comprises:
determining each feature to be generated according to the dependency weights of the target generated features relative to each feature to be generated; and
according to the features to be generated, generating the image feature vectors according to the feature generation sequence.

9. The method according to claim 8, wherein determining each feature to be generated according to the dependency weights of the target generated features relative to each feature to be generated comprises:
according to the dependency weights of the target generated features relative to each feature to be generated, using a preset feature generation formula to determine each feature to be generated,
wherein the preset feature generation formula is:

$$Tij = \Sigma W_{xy} A(x,y),$$

wherein Tij is the feature to be generated at the position of an ith row and a jth column; Wxy represents a dependency weight of the target generated feature relative to the feature Tij to be generated; A(x, y) is a target generated feature corresponding to the feature Tij to be generated in the xth row and yth column, i∈ [0, Nw], j∈ [0, Nh], x=[0, Nw], y∈ [0, Nh], Nw is a row number of the features in the sample image, and Nh is a column number of the features in the sample image.

10. The method according to claim 3, wherein according to the dependency relationships between the features to be generated and the target generated features, generating the image feature vectors according to the feature generation sequence comprises:
for each of the features to be generated, merging the target generated features having a dependency relationship with the feature to be generated, to generate a corresponding feature to be generated; and
according to the features to be generated, generating the image feature vectors according to the feature generation sequence.

11. The method according to claim 1, wherein updating parameters of the initial multi-modal model according to target texts corresponding to the text feature vectors, and the candidate texts, so as to determine a target multi-modal model comprises:
calculating a loss value according to the target texts and the candidate texts; and
according to the calculated loss value, updating the parameters of the initial multi-modal model to determine the target multi-modal model.

12. The method according to claim 1, wherein the feature generation sequence is a clockwise order from outside to inside or a counterclockwise order from outside to inside.

13. The method according to claim 12, wherein the first feature starts from a feature corresponding to any one of four corners of each sample image.

14. The method according to claim 1, wherein the feature generation sequence decides the association relationships between the features to be generated and the generated features.

15. The method according to claim 1, comprising:
producing no damage to the local receptive fields in the process of generating the image feature vectors.

16. The method according to claim 1, wherein the transformer structure of the initial multi-modal model is configured to convert the text feature vectors and the image feature vectors, and output candidate texts corresponding to the sample image.

17. An image recognition method, wherein the method comprises:
acquiring a target image to be recognized; and
inputting the target image into a target multi-modal model, and outputting a text corresponding to the target image, wherein the target multi-modal model is obtained according to a multi-modal model training method, wherein the multi-modal model training method comprises:
acquiring sample images and text feature vectors corresponding to the sample images;
inputting the sample images into a feature extraction network of an initial multi-modal model, so as to generate image feature vectors corresponding to the sample images, wherein the feature extraction network is used for encoding the sample images, and generating the image feature vectors according to association relationships between features to be generated and generated features;
inputting the text feature vectors and the image feature vectors into a transformer structure of the initial multi-modal model, and outputting candidate texts corresponding to the sample images; and
updating parameters of the initial multi-modal model according to target texts corresponding to the text feature vectors, and the candidate texts, so as to determine a target multi-modal model;
wherein inputting the sample images into the feature extraction network of the initial multi-modal model, so as to generate the image feature vectors corresponding to the sample images comprises: acquiring a feature generation sequence corresponding to each sample image; and generating the image feature vectors according to the association relationships between the features to be generated and the generated features and the feature generation sequence;
wherein generating the image feature vectors according to the association relationships between the features to be generated and the generated features and the feature generation sequence comprises: determining the generated features around each feature to be generated; and generating, from outside to inside, all the image feature vectors according to the association relationships between the features to be generated and the generated features around same and the feature generation sequence.

18. An electronic device, comprising a memory and a processor, wherein the memory stores a computer instruction, and by executing the computer instruction, the processor executes following actions:
acquiring sample images and text feature vectors corresponding to the sample images;
inputting the sample images into a feature extraction network of an initial multi-modal model, so as to generate image feature vectors corresponding to the sample images, wherein the feature extraction network is used for encoding the sample images, and generating the image feature vectors according to association relationships between features to be generated and generated features;
inputting the text feature vectors and the image feature vectors into a transformer structure of the initial multi-modal model, and outputting candidate texts corresponding to the sample images; and
updating parameters of the initial multi-modal model according to target texts corresponding to the text feature vectors, and the candidate texts, so as to determine a target multi-modal model;
wherein inputting the sample images into the feature extraction network of the initial multi-modal model, so as to generate the image feature vectors corresponding to the sample images comprises: acquiring a feature generation sequence corresponding to each sample image; and generating the image feature vectors according to the association relationships between the features to be generated and the generated features and the feature generation sequence;
wherein generating the image feature vectors according to the association relationships between the features to be generated and the generated features and the feature generation sequence comprises: determining the generated features around each feature to be generated; and generating, from outside to inside, all the image feature vectors according to the association relationships between the features to be generated and the generated features around same and the feature generation sequence.

* * * * *